(12) United States Patent
Brown et al.

(10) Patent No.: US 11,629,574 B2
(45) Date of Patent: Apr. 18, 2023

(54) ELECTRICAL SUBMERSIBLE PUMP GAS RELIEF VALVE

(71) Applicant: Halliburton Energy Services, Inc., Houston, TX (US)

(72) Inventors: Donn Jason Brown, Broken Arrow, OK (US); Ketankumar Kantilal Sheth, Tulsa, OK (US); Casey Laine Newport, Tulsa, OK (US); Trevor Alan Kopecky, Owasso, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 77 days.

(21) Appl. No.: 17/378,402

(22) Filed: Jul. 16, 2021

(65) Prior Publication Data

US 2023/0019875 A1 Jan. 19, 2023

(51) Int. Cl.
| E21B 34/06 | (2006.01) |
| F16K 11/074 | (2006.01) |
| E21B 47/008 | (2012.01) |
| E21B 49/08 | (2006.01) |
| E21B 43/12 | (2006.01) |
| E21B 47/10 | (2012.01) |

(52) U.S. Cl.
CPC .......... *E21B 34/066* (2013.01); *E21B 43/128* (2013.01); *E21B 47/008* (2020.05); *E21B 49/087* (2013.01); *F16K 11/074* (2013.01); *E21B 47/10* (2013.01)

(58) Field of Classification Search
CPC .... E21B 34/066; E21B 47/008; E21B 43/128; E21B 49/087; F16K 11/074
See application file for complete search history.

(56) References Cited

U.S. PATENT DOCUMENTS

| 3,545,541 | A | * | 12/1970 | DeVries | E21B 23/12 |
| | | | | | 166/368 |
| 4,624,310 | A | | 11/1986 | Echols et al. | |
| 11,319,786 | B2 | * | 5/2022 | Brown | E21B 43/126 |
| 2016/0084254 | A1 | * | 3/2016 | Dowling | E21B 43/128 |
| | | | | | 417/44.2 |
| 2019/0234178 | A1 | | 8/2019 | Panda et al. | |
| 2019/0264518 | A1 | | 8/2019 | Al-Gouhi et al. | |

FOREIGN PATENT DOCUMENTS

| CN | 104968887 A | 10/2015 |
| WO | 2021096531 A1 | 5/2021 |

OTHER PUBLICATIONS

Foreign Communication from Related Application—International Search Report and Written Opinion of the International Searching Authority, International Application No. PCT/US2021/042597, dated Apr. 22, 2022, 11 pages.

\* cited by examiner

*Primary Examiner* — D. Andrews
(74) *Attorney, Agent, or Firm* — Conley Rose, P.C.; Rodney B. Carroll

(57) ABSTRACT

The disclosure provides a pump system including a pump, a gas relief valve coupled to the pump, a motor configured to turn the pump, and a sensor configured to measure a parameter of at least one of a fluid or the pump system. The gas relief valve includes an actuator and a rotary disk system, and the rotary disk system includes a stationary disk and a rotary disk. The actuator is rotationally coupled to the rotary disk, and in a first position, the gas relief valve directs a flow of a fluid into a production tubing and in a second position, the gas relief valve directs the flow of the fluid into an annulus of a wellbore.

20 Claims, 6 Drawing Sheets

ELECTRICAL SUBMERSIBLE PUMP GAS RELIEF VALVE

TECHNICAL FIELD OF THE INVENTION

The present disclosure relates generally to well drilling and hydrocarbon recovery operations and, more particularly, to systems and methods for relieving gas build-up from a submersible pump.

BACKGROUND

Hydrocarbons, such as oil and gas, are produced or obtained from subterranean reservoir formations that may be located onshore or offshore. The development of subterranean operations and the processes involved in removing hydrocarbons from a subterranean formation typically involve several different steps, for example, drilling a wellbore at a desired well site, treating the wellbore to optimize production of hydrocarbons, performing the necessary steps to produce the hydrocarbons from the subterranean formation, and pumping the hydrocarbons to the surface of the earth.

When performing subterranean operations, pump systems, for example, electrical submersible pump (ESP) systems, may be used when reservoir pressure alone is insufficient to produce hydrocarbons from a well. For example, ESPs may be installed in a lower portion of the wellbore and used to pressurize fluids. ESPs may be used as an artificial lift method in downhole oil wells by creating the necessary lift or pressure to send fluids from the depths of the wellbore toward the surface. ESPs are very effective fluid moving devices and can be sized for different volumes of fluid and different required pressures or head necessary to pump the fluids to the surface. In order to handle higher pressure, ESP pumps are built in multiple stage configuration based on the pressure required. The range of number of pump stages can be in a range of a few to several hundreds of stages. The ESP pump stages are designed to move a liquid as the liquid is almost completely non-compressible, however, in many production zones, gas is present and is pulled into an ESP with the fluid through the intake ports.

Generally, a submersible pump does not operate or function efficiently when exposed to gas. A pump can handle small quantities of gas (typically less than ten percent), but even small quantities of gas causes the pump to suffer some degradation of hydraulic performance. Economic and efficient pump operation may be affected by gas-laden fluid. The presence of gas in a pump causes a reduction in pressure created within the pump stages, reducing output of the pump. Large quantities of gas can create total stoppage of fluid flow due to the high pressure in the upper end of the pump and the column of liquid in the production tubing above the pump. The gas builds up in the individual stage impeller vanes in the lower part of the pump and blocks the flow of the fluid, and therefore the stages cannot hydraulically move the fluid. This phenomenon is referred to as a "gas lock" condition, where gas is so prominent within the stages of the pump, the intended production fluid cannot be pumped to the surface.

When a gas lock condition is encountered, different tactics may be employed: for example, speeding up the speed (RPMs) of the pump to force out the gas, slowing down the speed of the pump in an effort to allow the bubbles of gas to coalesce out of the stages, or stopping the pump altogether which, because of the column of fluid above the pump, causes the fluid to flow backwards through the pump and reverses the rotation of the pump. Reversal of the rotation of the pump flushes or allows the gas to coalesce out of the pump until the fluid reaches an equilibrium in the casing. Other various methods that utilize separation systems have been designed that separate the gas from the liquid before the gas reaches the pump or stages are created to reduce the gas lock condition. As pumping must be stopped or delayed when using these methods, costs associated with an operation are increased including completion time for the overall operation and profits as well as a reduction in production of the fluid.

Figure 1:
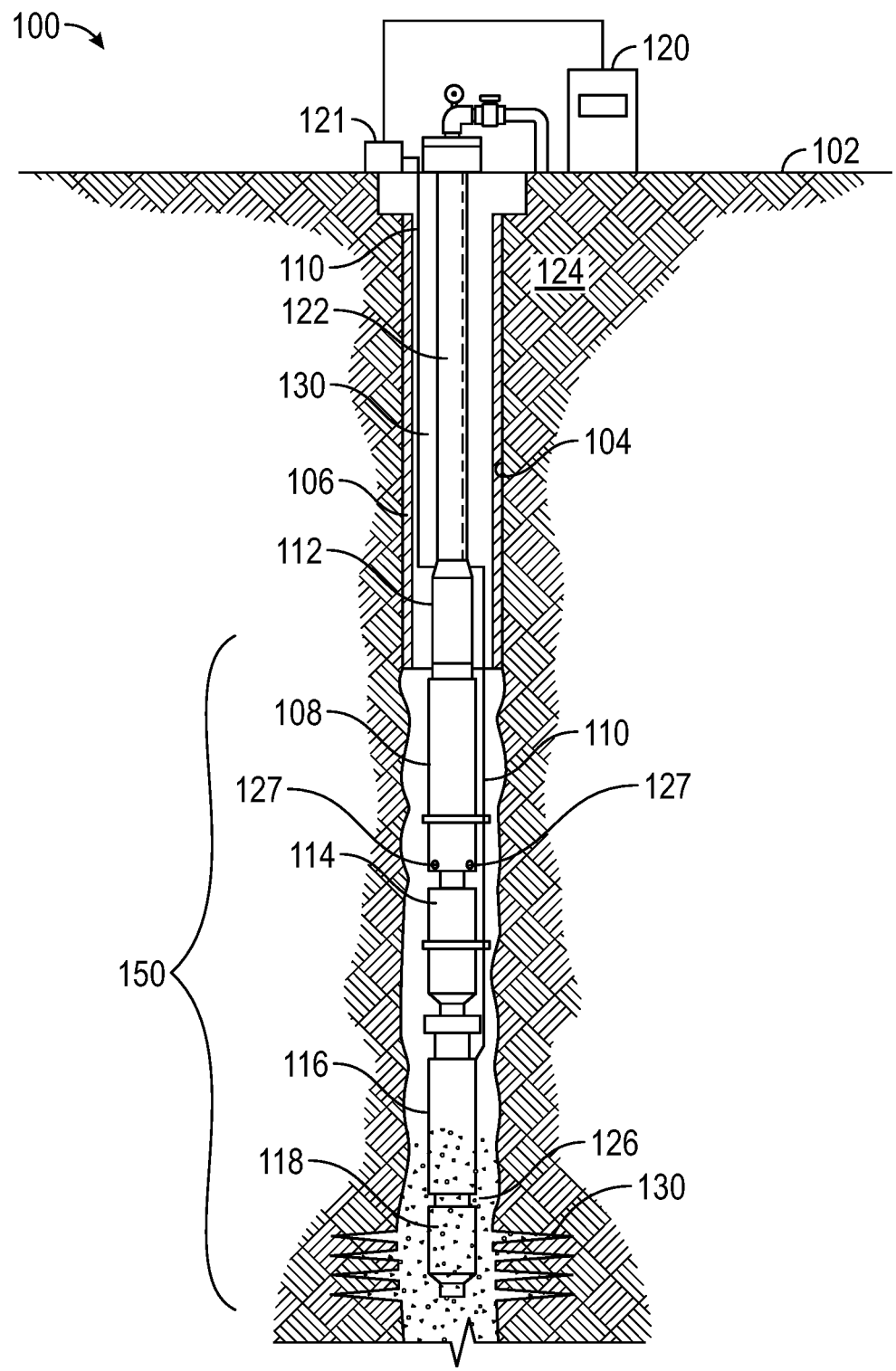
FIG. 1 is an illustrative well environment according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

A pump system having a gas relief valve that operates to release gas particles built up in the pump system is disclosed. In one or more embodiments, a gas relief valve may be located at the head or top of a pump system such that when the pump system experiences a gas lock condition, the gas relief valve may close a production flow path, which prevents the fluid in the production tubing above the pump system from draining back into the pump system, while opening a gas release flow path, which allows for the release of the gas particles that have built up in the pump system through an exit port of the gas relief valve and into an annulus of the wellbore. Isolating the pump system from the fluid in the production tubing removes the column of pressure created by the fluid in the production tubing from acting upon and holding gas particles within impeller vanes of a pump of the pump system. This removal of the pressure created by the fluid in the production tubing in addition to the gas relief valve opening a gas release flow path allows the pump system to pump the gas particles through the exit port of the gas relief valve and into the annulus of the wellbore, thus removing the impedance on the impeller vanes of the pump. Once the gas particles have been released into the annulus of the wellbore, the gas relief valve may close the gas release flow path while opening the production flow path and may resume production of downhole hydrocarbons.

Illustrative embodiments of the present disclosure are described in detail herein. In the interest of clarity, not all features of an actual implementation may be described in this specification. It will of course be appreciated that in the development of any such actual embodiment, numerous implementation specific decisions may be made to achieve the specific implementation goals, which may vary from one implementation to another. Moreover, it will be appreciated that such a development effort might be complex and time consuming but would nevertheless be a routine undertaking for those of ordinary skill in the art having the benefit of the present disclosure.

The terms "couple" or "couples," as used herein are intended to mean either an indirect or direct connection. Thus, if a first device couples to a second device, that connection may be through a direct connection, or through an indirect electrical connection or a shaft coupling via other devices and connections. Further, the term "above" as used herein is intended to mean "uphole from" and "below" as used herein is intended to mean "downhole from."

FIG. 1 illustrates a well site environment 100, according to one or more aspects of the present disclosure. While the well site environment 100 illustrates a land-based subterranean environment, the present disclosure contemplates any well site environment including a subsea environment. In one or more embodiments, any one or more components or elements may be used with subterranean operations equipment located on offshore platforms, drill ships, semi-submersibles, drilling barges and land-based rigs.

In one or more embodiments, well site environment 100 comprises a wellbore 104 below a surface 102 in a formation 124. In one or more embodiments, a wellbore 104 may comprise a nonconventional, horizontal inland, offshore or any other type of wellbore. Wellbore 104 may be defined in part by a casing string 106 that may extend from a surface 102 to a selected downhole location. Portions of wellbore 104 that do not comprise the casing string 106 may be referred to as open hole.

In one or more embodiments, various types of hydrocarbons or fluids may be pumped from wellbore 104 to the surface 102 using a pump system 150 disposed or positioned downhole, for example, within, partially within, or outside casing 106 of wellbore 104. In one or more embodiments, pump system 150 may comprise an electrical submersible pump (ESP) system. Pump system 150 may comprise a pump 108, electrical cables 110, a gas relief valve 112, a seal or equalizer 114, a motor 116, and a downhole sensor 118. The pump 108 may be an ESP, including but not limited to, a multi-stage centrifugal pump, a rod pump, a progressive cavity pump, positive displacement pump, or any other suitable pump system or combination thereof. The pump 108 may transfer pressure to the fluid 126 or any other type of downhole fluid to propel the fluid from downhole to the surface 102 at a desired or selected pumping rate. In one or more embodiments, fluid 126 may be a multi-phase wellbore fluid comprising one or more hydrocarbons. For example, fluid 126 may be a two-phase fluid that comprises a gas phase and a liquid phase from a wellbore or reservoir in the formation 124. Further, in one or more embodiments, fluid 126 may enter the wellbore 104, casing 106, or both through one or more perforations 130 in the formation 124 and flow uphole to one or more intake ports 127 of the pump system 150, wherein the one or more intake ports 127 are disposed at a distal end of the pump 108. The pump 108 may transfer pressure to the fluid 126 by adding kinetic energy to the fluid 126 via centrifugal force created by rotation of one or more impeller vanes (not shown) and converting the kinetic energy to potential energy in the form of pressure. In one or more embodiments, pump 108 lifts fluid 126 to the surface 102. Further, in one or more embodiments, the pump 108 may transfer pressure to the fluid 126 by means of positively displacing the fluid against a certain desired well head pressure In one or more embodiments, the gas relief valve 112 may be coupled to an upper end of the pump 108, and the seal or equalizer 114 may be coupled to a lower end of the pump 108. The gas relief valve 112 may be coupled to the upper end of the pump 108 by way of a threaded or bolted connection. During operations, gas present in the fluid 126 may be forced out of the pump 108 via the gas relief valve 112 into an annulus 130 of the wellbore 104. The gas relief valve will be described in more detail below with regard to FIGS. 2, 3A, and 3B. While the gas relief valve and the pump are depicted as separate parts coupled together, one of ordinary skill in the art would understand that in other embodiments, the gas relief valve may instead be built into the pump as part of the pump head. Additionally, during operations, the seal or equalizer 114 is configured to equalize the pressure in the wellbore with the pressure inside the motor of the pump system, provide thermal expansion area for the motor oil and isolate the motor oil from the well fluid, and absorb any load exerted on the pump system by the normal operation of the motor.

Further, in one or more embodiments, the motor 116 of the pump system 150 may be disposed below and coupled to the seal or equalizer 114. In one or more embodiments, motor 116 is an electrical submersible motor configured or operated to turn pump 108 and may, for example, be a two or more-pole, three-phase squirrel cage induction motor or a permanent magnet ESP style motor. In one or more embodiments, the motor 116 may be a hydraulic or linear motor. Further, in one or more embodiments, a production tubing section 122 may be coupled to the pump system 150. As illustrated, in one or more embodiments, the production tubing section 122 may be directly coupled to the gas relief valve 112 of the pump system 150. The production tubing section 122 may be coupled to the gas relief valve 112 by way of a threaded or bolted connection. However, one of ordinary skill in the art would understand that in other embodiments, the production tubing section may be coupled to the pump system using one or more connectors. Further, in one or more embodiments, any one or more production tubing sections 122 may be coupled together to extend the pump system 150 into the wellbore 104 to a desired or specified location. Any one or more components of fluid 126 may be pumped from pump 108 through production tubing 122 to the surface 102 for transfer to a storage tank, a pipeline, transportation vehicle, any other storage, distribution or transportation system and any combination thereof.

Furthermore, in one or more embodiments, the downhole sensor 118 of the pump system 150 may be disposed below and coupled to the motor 116. The downhole sensor 118 may be any suitable sensor utilized to measure a parameter of the fluid 126 during operations. Additionally, the electrical cables 110 may be electrically coupled to the motor 116, the gas relief valve 112, and the downhole sensor 118. The electrical cables 110 may provide power to the motor 116, the gas relief valve 112, and the downhole sensor 118, may transmit one or more control or operation instructions to the motor 116 and/or the gas relief valve 112 from a controller 120 disposed above the surface 102, and may transmit data to the controller 120 from the downhole sensor 118. Further, as illustrated, in one or more embodiments, electrical cables 110 may be communicatively coupled to a surface sensor 121 disposed at the surface 102. In one or more embodiments, the surface sensor 121 may be a flowmeter, which may measure and monitor a flow rate of the fluid 126 being pumped through the pump system 150 and production tubing 122. However, one of ordinary skill in the art would appreciate that the surface sensor 121 may be any suitable sensor utilized to measure a parameter of the fluid 126 or the pump system 150.

While two electrical cables 110 are illustrated, one of ordinary skill in the art would understand that a single electrical cable may be used to connect to the motor 116, the gas relief valve 112, or both. Further, while the gas relief valve 112 is illustrated as being electrically and communicatively coupled to the surface sensor 121 by way of electrical cables 110, one of ordinary skill in the art would understand that the gas relief valve may instead be electrically and communicatively coupled to the downhole sensor 118 by way of electrical cables 110 and receive power and control or operation instructions therefrom. Furthermore, while in one or more embodiments, the gas relief valve 112 is powered by and receives control or operation instructions by way of electrical cables 110, one of ordinary skill in the art would understand that in other embodiments, hydraulic lines may be coupled to the gas relief valve 112 from above the surface, and the gas relief valve may be hydraulically operated.

Figure 2:
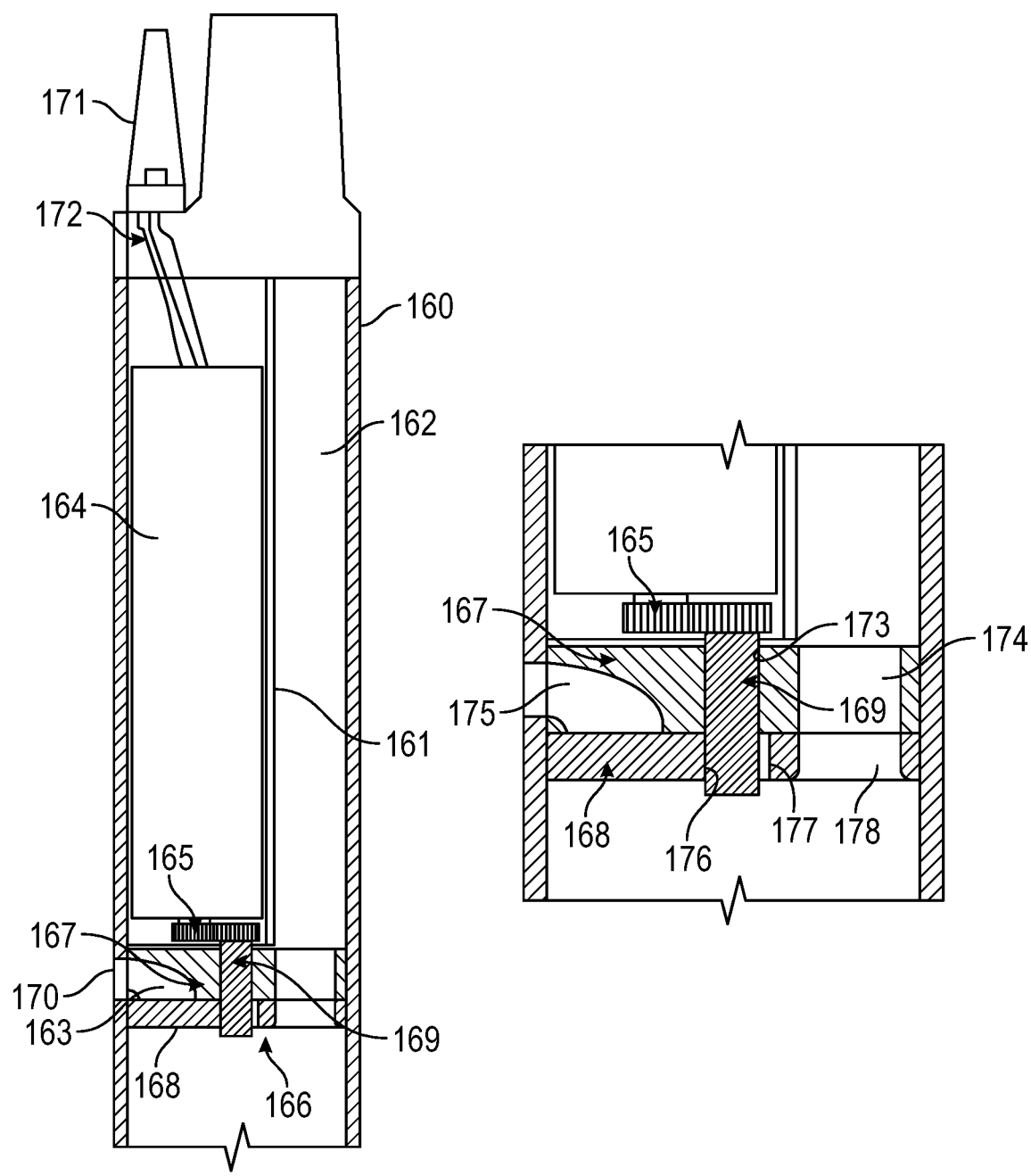
FIG. 2 is a cross-sectional view of an electrically powered gas relief valve according to one or more aspects of the present disclosure.

FIG. 2 illustrates a cross-sectional view of an electrically powered gas relief valve 112 according to one or more aspects of the present disclosure. In one or more embodiments, a gas relief valve 112 may include a housing 160, an actuator isolation wall 161, an actuator 164, a rotary disk system 166, a power connector 171, and an internal electrical cable 172. As discussed above, the gas relief valve 112 may be coupled at a top end to a production tubing section and at a bottom end to a pump. The housing 160 may be tubular in shape, be open at the bottom and configured to receive a fluid from the pump, and be open at the top such that the fluid may exit the gas relief valve 112 and enter the production tubing section. The housing 160 may further include a vent port 170 disposed on a side wall as discussed in more detail below.

In one or more embodiments, the actuator isolation wall 161 may be disposed within the housing 160 such that it creates a production flow path 162 on a first side of the actuator isolation wall 161. Further, the actuator 164 may be disposed on a second side of the actuator isolation wall 161 such that the actuator isolation wall 161 separates the production flow path 162 from the actuator 164 and ensures that during operation of the pump, as described above with respect to FIG. 1, the fluid does not contact the actuator. Furthermore, the rotary disk system 166 may be disposed within the housing and contact a bottom end of the actuator isolation wall 161 so as to further isolate the actuator 164 from the production flow path 162 and any fluid that may flow therethrough. Additionally, the rotary disk system 166 may be disposed within the housing so as to create a gas release flow path 163 within the housing 160 and separate the gas release flow path 163 from the production flow path 162. In one or more embodiments, the gas release flow path 163 created by the rotary disk system 166 may travel through the rotary disk system 166 and exit the housing through the vent port 170. Thus, in one or more embodiments the vent port 170 may be disposed on the side wall of the housing 160 radially opposite from the location of the production flow path 162 formed within the housing 160. Further, as illustrated, the vent port 170 may be disposed adjacent to the rotary disk system 166 such that the gas release flow path 163 travels through the rotary disk system 166 directly to the vent port 170. However, one of ordinary skill in the art would understand that in other embodiments, the vent port 170 need not be adjacent to the rotary disk system 166 and need only be disposed on the side wall of the housing such that the gas release flow path 163 is fluidly separated from the production flow path 162.

Further, in one or more embodiments, the rotary disk system may be mechanically coupled to the actuator 164 and configured to switch a flow path of fluid within the housing 160 between the production flow path 162 and the gas release flow path 163. As illustrated, the actuator 164 may include a gear system 165 that is coupled to the rotary disk system 166 and configured to rotate the rotary disk system between a first position in which the flow path through the housing 160 is through the production flow path 162 and a second position in which the flow path through the housing 160 is through the gas release flow path 163. However, one of ordinary skill in the art would appreciate that in one or more embodiments, the actuator may be any motorized actuator using mechanical means to actuate the rotary disk system 166. Furthermore, the power connector 171 of the gas relief valve 112 may be disposed on an external surface of the housing 160 on or near the top end of the housing 160. The power connector 171 may be electrically and communicatively coupled to the actuator by way of the internal electrical cable 172. Additionally, in one or more embodiments, the power connector 171 may be coupled to an electrical cable 110 as described with regard to FIG. 1 and thus may received power and control or operation instructions therefrom. While an electrically powered actuator is depicted, one of ordinary skill in the art would understand that a hydraulic motor or any other hydraulically driven actuator may be used instead to actuate the rotary disk system 166, and instead of a power connector and an internal electrical cable, the gas relief valve may include hydraulic line connectors and internal hydraulic cables.

Still referring to FIG. 2, in one or more embodiments, the rotary disk system 166 may include a stationary disk 167, a rotary disk 168, and a drive shaft 169. In one or more embodiments, the stationary disk 167 may be disposed above the rotary disk 168, and the drive shaft 169 may be disposed through the stationary disk 167 such that the drive shaft 169 may rotate freely within the stationary disk 167. Further, the drive shaft may be coupled to and rotationally locked to the rotary disk 168 such that rotation of the drive shaft 169 rotates the rotary disk. More specifically, in one or more embodiments, the drive shaft 169 may be keyed to the rotary disk 168 such that rotation of the drive shaft 169 rotates the rotary disk 168. However, one of ordinary skill in the art would understand that in one or more embodiments, the drive shaft may be rotationally locked to the rotary disk by an interlocking spline or any other means of affixing the rotary disk to the drive shaft. In one or more embodiments, the drive shaft is configured to rotate in a first direction from the first position to the second position and to rotate the opposite direction back from the second position to the first position. Further, in one or more embodiments, the drive shaft 169 and the rotary disk 168 may rotate 180° when rotating from the first position to the second position. However, one of ordinary skill in the art would understand that in one or more embodiments, the drive shaft may be configured to rotate any angle so long as in the first position, the flow path through the housing 160 is through the production flow path 162, and in the second position, the flow path through the housing 160 is through the gas release flow path 163.

In one or more embodiments, the stationary disk 167 of the rotary disk system 166 may include a drive shaft opening 173, a production flow path opening 174, and a gas release flow path opening 175. The drive shaft opening 173 may be disposed in a center of the stationary disk 167 and may be sized such that the drive shaft 169 may be disposed through the drive shaft opening 173 and free to rotate within the drive shaft opening 173 without rotating the stationary disk 167. Further, the production flow path opening 174 may be an opening formed vertically through the stationary disk 167 from the bottom to the top of the stationary disk 167. Furthermore, the production flow path opening 174 may be formed between the drive shaft opening 173 and an outer circumference of the stationary disk 167. Additionally, the gas release flow path opening 175 may be an opening formed through the stationary disk 167 that travels from the bottom of the stationary disk 167 to the side of the stationary disk 167 (i.e., from the bottom to the circumference of the stationary disk between the top and bottom of the stationary disk). Further, the gas release flow path opening 175 may begin on the bottom side of the stationary disk 167 between the drive shaft opening 173 and an outer circumference of the stationary disk 167 and may be disposed radially opposite from the production flow path opening 173. Furthermore, as illustrated, the gas release flow path opening 175 may form a curved path between the bottom of the stationary disk 167 and the side of the stationary disk 167. However, one of ordinary skill in the art would understand that in other embodiments, the path formed by the gas release flow path opening may be of any shape so long as the opening forms a path from the bottom of the stationary disk 167 to the side of the stationary disk 167. When the rotary disk system 166 is installed into the housing 160 of the gas relief valve 112, the gas release flow path opening 175 may be aligned with the vent port 170 of the housing 160, while the production flow path opening 174 may be aligned with the production flow path 162 formed through the housing 160.

Additionally, in one or more embodiments, the stationary disk 167 may be made of a carbide material or any other hardened material. Carbide material may be made from any combination of tungsten, silicon, nickel, chromium or any other desired material having desired properties. However, one of ordinary skill in the art would understand that the stationary disk 167 may be made of any material with high abrasion and corrosion resistance, such as tungsten carbide, silicon carbide, boron carbide, ceramic, NI-Resist iron, stainless steel, duplex steel, carbides, nickel alloys or any other desired materials having desired properties.

Further, in one or more embodiments, the rotary disk 168 may include a drive shaft opening 176, a key slot 177, and a flow path opening 178. The drive shaft opening 176 may be disposed in a center of the rotary disk 168 and may be sized such that the drive shaft 169 may be disposed through the drive shaft opening 176. In one or more embodiments, a key slot 177 may be formed in the drive shaft opening 176 of the rotary disk 168 such that a key (not shown) disposed on the drive shaft 169 may be aligned with and disposed within the key slot 177 to rotationally lock the drive shaft 169 to the rotary disk 168. While the rotary disk is depicted having a key slot, one of ordinary skill in the art would understand that in one or more embodiments, the rotary disk may include grooves that correspond to and mesh with ridges or teeth disposed on the drive shaft such that the drive shaft is splined together with the rotary disk. Further, in one or more embodiments, the flow path opening 178 may be an opening formed straight through the rotary disk 168 from the bottom to the top of the rotary disk 167. Furthermore, the flow path opening 178 may be formed between the drive shaft opening 176 and an outer circumference of the rotary disk 168. When the rotary disk system 166 is installed into the housing 160 of the gas relief valve 112, the flow path opening 178 may initially be aligned with the production flow path opening 174 of the stationary disk 167, and thus may be aligned with the production flow path 162 formed through the housing 160. When the flow path opening 178 of the rotary disk 168 is aligned with the production flow path opening 174 of the stationary disk and the production flow path 162 formed through the housing 160, the rotary disk system 166 is in the first position as discussed above. However, as discussed above, the rotary disk 168 may be configured to rotate such that the flow path opening 178 of the rotary disk 168 may align with the gas relief opening 175 of the stationary disk 167. When the flow path opening 178 of the rotary disk 168 is aligned with the gas release flow path opening 175 of the stationary disk 167, the rotary disk system 166 is in the second position as discussed above. More specifically, in the first position, the rotary disk 168 and the stationary disk 167 may be configured to allow fluid pumped through the gas relief valve 112 to travel through the production flow path 162, and in the second position, the rotary disk 168 and the stationary disk 167 may be configured to seal off the production flow path 162 and allow fluid pumped through the gas relief valve 112 to travel through the gas release flow path 163 and through the vent port 170 into the annulus of the wellbore.

Additionally, in one or more embodiments, the rotary disk 168 may be made of a carbide material or any other hardened material. Carbide material may be made from any combination of tungsten, silicon, nickel, chromium or any other desired material having desired properties. However, one of ordinary skill in the art would understand that the rotary disk 168 may be made of any material with high abrasion and corrosion resistance, such as tungsten carbide, silicon carbide, boron carbide, ceramic, NI-Resist iron, stainless steel, duplex steel, carbides, nickel alloys or any other desired materials having desired properties.

Figure 3A:
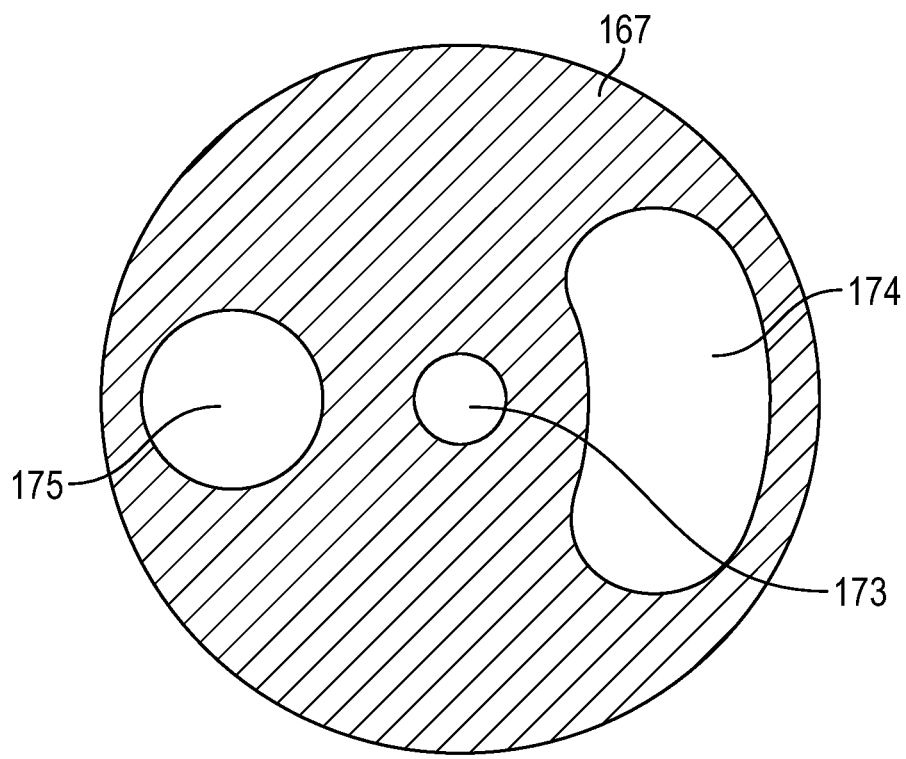
FIG. 3A is a bottom view of a stationary disk of a gas relief valve according to one or more aspects of the present disclosure.
Figure 3B:
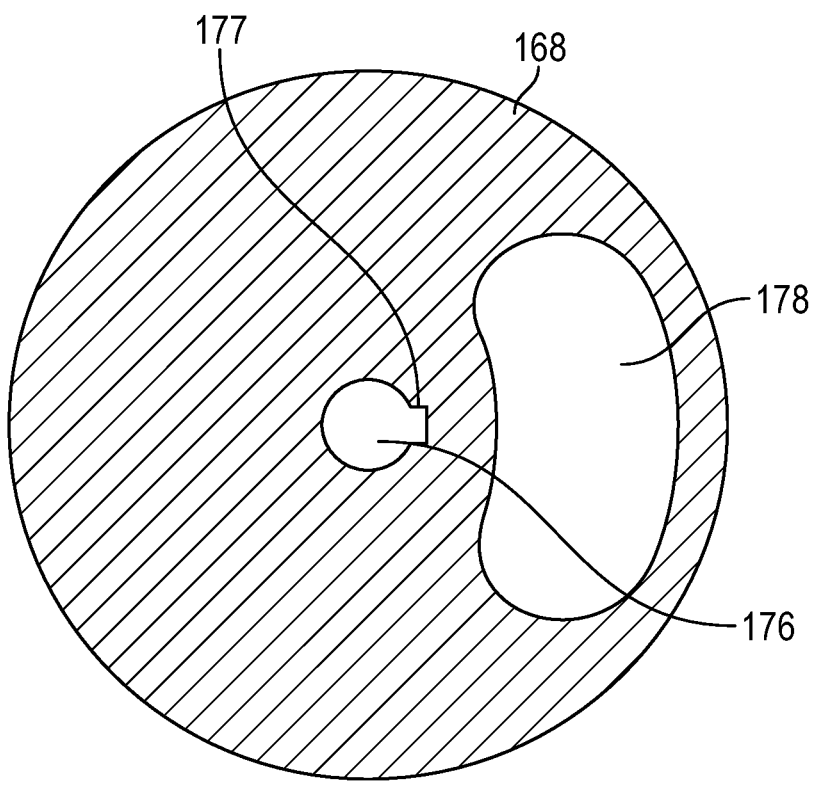
FIG. 3B is a bottom view of a rotary disk of a gas relief valve according to one or more aspects of the present disclosure.

Referring now to FIGS. 3A and 3B, bottom views of a stationary disk 167 and a rotary disk 168 of a gas relief valve are illustrated according to one or more aspects of the present disclosure. In one or more embodiments, the stationary disk 167 may include a drive shaft opening 173, a production flow path opening 174, and a gas release flow path opening 175 as described above with respect to FIG. 2. Further, as illustrated, the production flow path opening 174 of the stationary disk 167 may be non-circular in shape. However, one of ordinary skill in the art would understand that the production flow path opening 174 may be any shape so long as the shape of the production flow path opening 174 is equivalent to or fits within a shape of the production flow path 162 formed in the housing 160. Further, as illustrated, the gas release flow path opening 175 may be generally circular in cross-sectional shape and travel along a curved path from the bottom to the side of the stationary disk 167. However, one of ordinary skill in the art would understand that the gas release flow path opening 175 may be any shape so long as the shape of the portion of the gas release flow path opening 175 at the side of the stationary disk 167 is equivalent to or fits within a shape of the vent port 170 formed in the housing 160.

Further, in one or more embodiments, the rotary disk 168 may include a drive shaft opening 176, a key slot 177, and a flow path opening 178 as described above with respect to FIG. 2. In one or more embodiments, the rotary disk 168 may be of full circular shape such that it fits within and abuts the inner diameter of the housing 160. However, one of ordinary skill in the art would understand that in other embodiments, the rotary disk may be of half-circular shape or any other shape so long as it blocks the gas release flow path when it is in a first position and it blocks the production flow path when it is in the second position. Furthermore, as illustrated, the flow path opening 178 of the rotary disk 168 may be non-circular in shape. Additionally, in one or more embodiments, the shape of the flow path opening 178 of the rotary disk 168 may be equivalent to the shape the production flow path opening 174 of the stationary disk 167. However, one of ordinary skill in the art would understand that the flow path opening 178 may be any shape so long as the shape of the flow path opening 178 is equivalent to or fits within a shape of the production flow path 162 formed in the housing 160.

Figure 4:
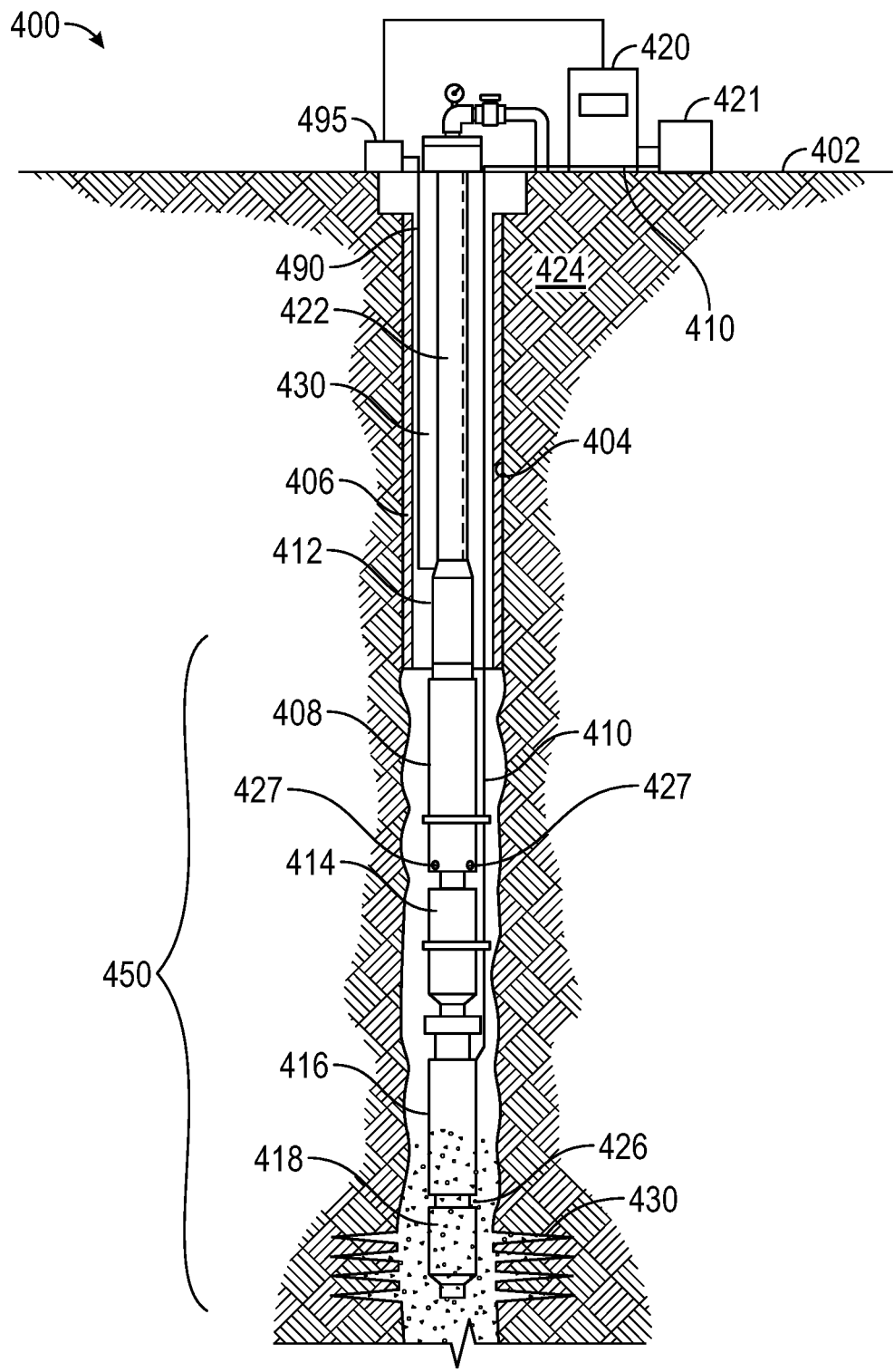
FIG. 4 is an illustrative well environment according to one or more aspects of the present disclosure.

Referring now to FIG. 4, a well site environment 400, according to one or more aspects of the present disclosure is illustrated. While the well site environment 400 illustrates a land-based subterranean environment, the present disclosure contemplates any well site environment including a subsea environment. In one or more embodiments, any one or more components or elements may be used with subterranean operations equipment located on offshore platforms, drill ships, semi-submersibles, drilling barges and land-based rigs.

In one or more embodiments, well site environment 400 comprises a wellbore 404 below a surface 402 in a formation 424. In one or more embodiments, a wellbore 404 may comprise a nonconventional, horizontal or any other type of wellbore. Wellbore 404 may be defined in part by a casing string 406 that may extend from a surface 402 to a selected downhole location. Portions of wellbore 404 that do not comprise the casing string 406 may be referred to as open hole.

In one or more embodiments, various types of hydrocarbons or fluids may be pumped from wellbore 404 to the surface 402 using a pump system 450 disposed or positioned downhole, for example, within, partially within, or outside casing 406 of wellbore 404. In one or more embodiments, pump system 450 may comprise an electrical submersible pump (ESP) system. Pump system 450 may comprise a pump 408, an electrical cable 410, a gas relief valve 412, a seal or equalizer 414, a motor 416, a downhole sensor 418, and hydraulic lines 490. The pump 408 may be an ESP, including but not limited to, a multi-stage centrifugal pump, a rod pump, a progressive cavity pump, any other suitable pump system or combination thereof. The pump 408 may transfer pressure to the fluid 426 or any other type of downhole fluid to propel the fluid from downhole to the surface 402 at a desired or selected pumping rate. In one or more embodiments, fluid 426 may be a multi-phase wellbore fluid comprising one or more hydrocarbons. For example, fluid 426 may be a two-phase fluid that comprises a gas phase and a liquid phase from a wellbore or reservoir in the formation 424. Further, in one or more embodiments, fluid 426 may enter the wellbore 404, casing 406, or both through one or more perforations 430 in the formation 424 and flow uphole to one or more intake ports 427 of the pump system 450, wherein the one or more intake ports 427 are disposed at a distal end of the pump 408. The pump 408 may transfer pressure to the fluid 126 by adding kinetic energy to the fluid 426 via centrifugal force created by rotation of one or more impeller vanes (not shown) and converting the kinetic energy to potential energy in the form of pressure. In one or more embodiments, pump 408 lifts fluid 426 to the surface 402.

In one or more embodiments, the gas relief valve 412 may be coupled to an upper end of the pump 408, and the seal or equalizer 414 may be coupled to a lower end of the pump 408. The gas relief valve 412 may be coupled to the upper end of the pump 408 by way of a threaded or bolted connection. During operations, gas present in the fluid 426 may be forced out of the pump 408 via the gas relief valve 412 into an annulus 430 of the wellbore 404. The gas relief valve may be connected to a hydraulic pump 495 at the surface 402 by way of hydraulic lines 490 and may be actuated by way of the hydraulic pump 495 to release gas present in the pump 408. The gas relief valve will be described in more detail below with regard to FIG. 5. While the gas relief valve and the pump are depicted as separate parts coupled together, one of ordinary skill in the art would understand that in other embodiments, the gas relief valve may instead be built into the pump as part of the pump head. Further, while the gas relief valve is depicted as being connected to the hydraulic pump 495, one of ordinary skill in the art would understand that in other embodiments, the hydraulic lines connected to the gas relief valve may be connected to upper and lower portions of the pump 408 such that changing pressure differential across the pump 408 may automatically actuate the gas relief valve. Additionally, during operations, the seal or equalizer 114 is configured to equalize the pressure in the wellbore with the pressure inside the motor of the pump system, provide area for and isolate the motor oil, and absorb any load exerted on the pump system by the normal operation of the motor.

Further, in one or more embodiments, the motor 416 of the pump system 450 may be disposed below and coupled to the seal or equalizer 414. In one or more embodiments, motor 416 is an electrical submersible motor configured or operated to turn pump 408 and may, for example, be a two or more-pole, three-phase squirrel cage induction motor or a permanent magnet ESP style motor. In one or more embodiments, a production tubing section 422 may be coupled to the pump system 450. As illustrated, in one or more embodiments, the production tubing section 422 may be directly coupled to the gas relief valve 412 of the pump system 450. The production tubing section 422 may be coupled to the gas relief valve 412 by way of a threaded or bolted connection. However, one of ordinary skill in the art would understand that in other embodiments, the production tubing section may be coupled to the pump system using one or more connectors. Further, in one or more embodiments, any one or more production tubing sections 422 may be coupled together to extend the pump system 450 into the wellbore 404 to a desired or specified location. Any one or more components of fluid 426 may be pumped from pump 408 through production tubing 422 to the surface 402 for transfer to a storage tank, a pipeline, transportation vehicle, any other storage, distribution or transportation system and any combination thereof.

Furthermore, in one or more embodiments, the downhole sensor 418 of the pump system 450 may be disposed below and coupled to the motor 416. The downhole sensor 418 may be any suitable sensor utilized to measure a parameter of the fluid 426 during operations. Additionally, the electrical cable 410 may be electrically coupled to the motor 416 and downhole sensor 418. The electrical cable 410 may provide power to the motor 416 and the downhole sensor 418, may transmit one or more control or operation instructions to the motor 416 from a controller 420 disposed above the surface 402, and may transmit data to the controller 420 from the downhole sensor 418. Further, as illustrated, in one or more embodiments, electrical cable 410 may be communicatively coupled to a surface sensor 421 disposed at the surface 402. In one or more embodiments, the surface sensor 421 may be a flowmeter, which may measure and monitor a flow rate of the fluid 426 being pumped through the pump system 450 and production tubing 422. However, one of ordinary skill in the art would appreciate that the surface sensor 421 may be any suitable sensor utilized to measure a parameter of the fluid 426 or the pump system 450.

Figure 5:
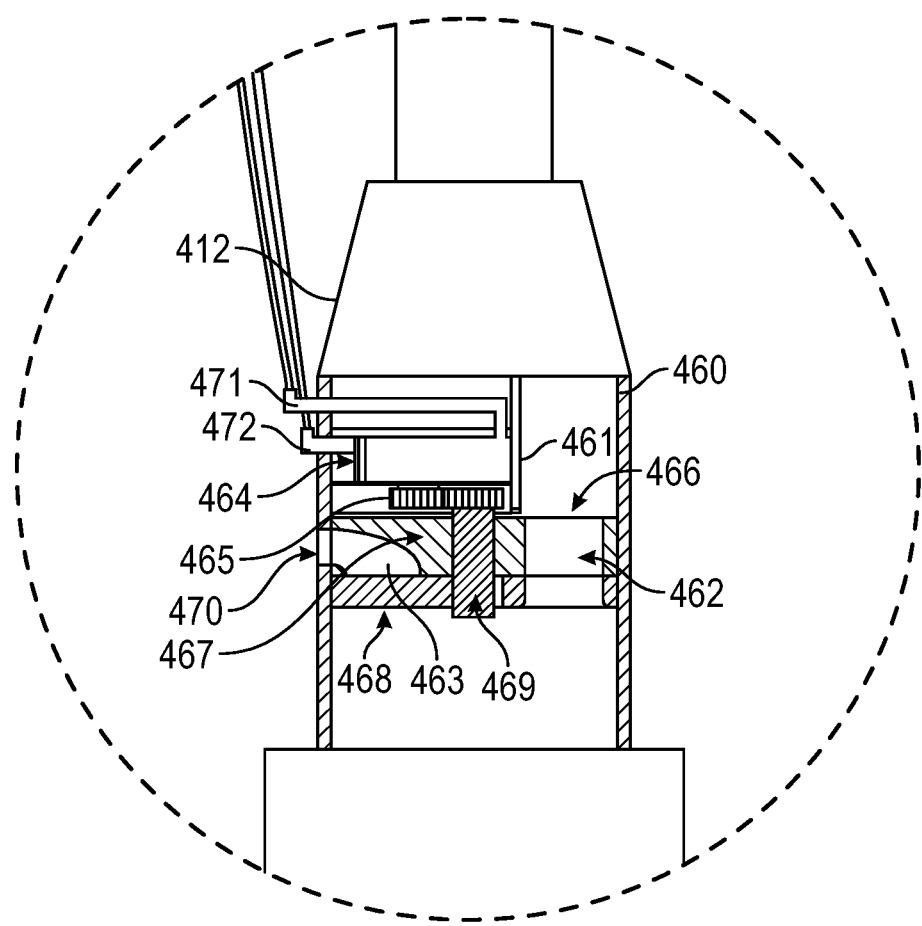
FIG. 5 is a cross-sectional view of a hydraulically powered gas relief valve according to one or more aspects of the present disclosure.

Referring now to FIG. 5, a cross-sectional view of a hydraulically powered gas relief valve 412 according to one or more aspects of the present disclosure is illustrated. In one or more embodiments, a gas relief valve 412 may include a housing 460, an actuator isolation wall 461, an actuator 464, a rotary disk system 466, a first hydraulic port 471, and second hydraulic port 472. The gas relief valve 412 may be substantially the same as the gas relief valve 112 described above with respect to FIGS. 2, 3A, and 3B. In one or more embodiments, the gas relief valve 412 of FIG. 5 may differ from the gas relief valve 112 of FIG. 2 with regard to the type of actuator used and the means for powering the actuator. More specifically, instead of an electrically powered actuator and electrical lines and connections, the gas relief valve 412 of FIG. 5 includes a hydraulically powered actuator 464 and hydraulic ports (the first hydraulic port 471 and the second hydraulic port 472) for connecting the actuator 464 to a hydraulic pump or other source of fluids necessary to create a pressure differential and drive the actuator 464. Further, while not depicted, in one or more embodiments, the gas relief valve 412 may include a spring coupled to the rotary disk system 466. In one or more embodiments, the spring may be coupled to the rotary disk system such that it biases the rotary disk of the rotary disk system either towards a first position in which a flow path through the housing is through a production flow path or towards a second position in which the flow path through the housing is through a gas release flow path.

As discussed above with respect to FIG. 2, the gas relief valve 412 of FIG. 5, includes a housing 460 having a vent port 470 disposed on a side wall. Further, the gas relief valve 412 includes an actuator isolation wall 461 disposed within the housing 460 such that it creates a production flow path 462 on a first side of the actuator isolation wall 461. Further, the actuator 464 may be disposed on a second side of the actuator isolation wall 461 such that the actuator isolation wall 461 separates the production flow path 462 from the actuator 464 and ensures that during operation of the pump, as described above with respect to FIG. 4, the fluid does not contact the actuator. Furthermore, a rotary disk system 466 may be disposed within the housing 460 and contact a bottom end of the actuator isolation wall 461 so as to further isolate the actuator 464 from the production flow path 462 and any fluid that may flow therethrough. Additionally, the rotary disk system 466 may be disposed within the housing so as to create a gas release flow path 463 within the housing 460 and separate the gas release flow path 463 from the production flow path 462. In one or more embodiments, the gas release flow path 463 created by the rotary disk system 466 may travel through the rotary disk system 466 and exit the housing through the vent port 470. Thus, in one or more embodiments the vent port 470 may be disposed on the side wall of the housing 460 radially opposite from the location of the production flow path 462 formed within the housing 460. Further, as illustrated, the vent port 470 may be disposed adjacent to the rotary disk system 466 such that the gas release flow path 463 travels through the rotary disk system 466 directly to the vent port 470. However, one of ordinary skill in the art would understand that in other embodiments, the vent port 470 need not be adjacent to the rotary disk system 466 and need only be disposed on the side wall of the housing such that the gas release flow path 463 is fluidly separated from the production flow path 462. Additionally, the rotary disk system 466 may include a stationary disk 467, a rotary disk 468, and a drive shaft 469 and may be identical to the rotary disk system 166 as described above with respect to FIGS. 2, 3A, and 3B.

In one or more embodiments, the rotary disk system 466 may be mechanically coupled to the actuator 464 and configured to switch a flow path of fluid within the housing 460 between the production flow path 462 and the gas release flow path 463. As illustrated, the actuator 464 may include a gear system 465 that is coupled to the rotary disk system 466 and configured to rotate the rotary disk system between a first position in which the flow path through the housing 460 is through the production flow path 462 and a second position in which the flow path through the housing 460 is through the gas release flow path 463. The actuator 464 may operate to rotate the rotary disk system 466 by way of hydraulic power. In some embodiments, hydraulic power may be provided to the actuator 464 by way of a hydraulic pump at the surface, while in other embodiments, hydraulic power may be provided by way of pressure differences experienced by other parts of a downhole pump system. By way of example only, in one or more embodiments, the actuator 464 may be hydraulically coupled to the pump 408 such that when gas begins to affect a lower area of the pump, the hydraulic pressure decreases to a point that it energizes the actuator in order to seal off the production flow path 462, open the gas release flow path 463, and vent off the gas built up in the pump. Further by way of example only, when the gaseous event ends, the pressure will build in the lower area of the pump and cause the actuator to seal off the gas release flow path 463, open the production flow path 462, and resume normal pumping operations. Further, in one or more embodiments, hydraulic lines may be coupled to the gas relief valve 412 by way of the first hydraulic port 471 and the second hydraulic port 472, and through the hydraulic lines, the actuator 464 may receive fluids of differing pressures in order to create a pressure difference that drives the actuator 464.

Figure 6:
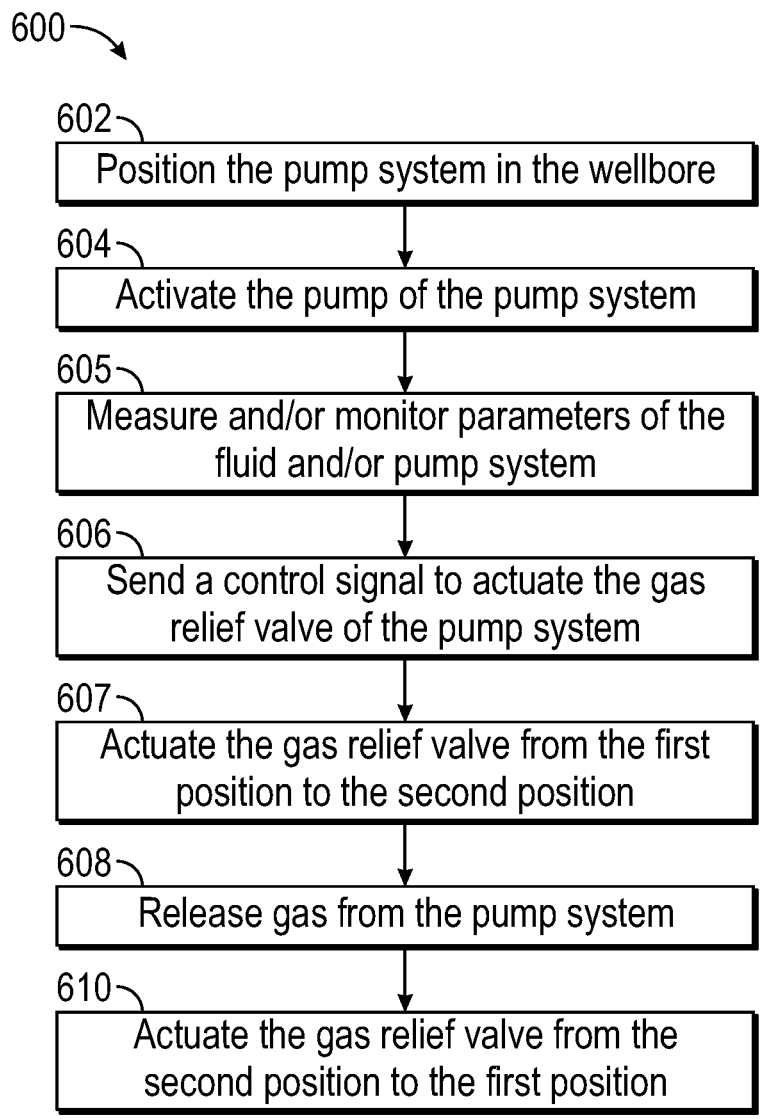
FIG. 6 is a flow chart illustrating a method of releasing gas from a pump (ESP) system, according to one or more aspects of the present disclosure.

FIG. 6 is a flow chart illustrating a method 600 for releasing gas trapped in a pump (ESP) system, according to one or more aspects of the present disclosure. At step 602, a pump system 150, 450 is positioned or disposed in a wellbore 104, 404 where the pump system 150, 450 comprises a gas relief valve 112, 412. In one or more embodiments, the pump system 150, 450 may be part of or included with a downhole tool. The pump system 150, 450 may be positioned or disposed such that one or more portions of the pump system 150, 450 are submerged in or otherwise adjacent to a fluid 126, 426 of FIGS. 1 and 4. Further, when the pump system 150, 450 is positioned or disposed in a wellbore, 104, 404, the rotary disk 168, 468 of the rotary disk system 166, 466 of the gas relief valve 112, 412 of the pump system 150, 450 may be in a first position, such that a flow path through the gas relief valve 112, 412 is through a production flow path 162, 462.

At step 604, the pump 108, 408 of the pump system 150, 450 may be activated such that pumping operations are commenced. Fluid 126, 426 is pushed or forced into the one or more intake ports 127, 427 by a fluid pressure of pump 108, 408 in the wellbore 104, 404. Fluid 126, 426 moves through the one or more pump stages to the gas relief valve 112, 412. The gas relief valve 112 allows the fluid 126, 426 to flow freely through the production flow path 162, 462 and into the production tubing section 122, 422 through which the fluid 126, 426 travels to the surface.

At step 605, during pumping operations, one or both of the downhole sensor 118, 418 and the surface sensor 121, 421 measure and/or monitor parameters of the fluid 126, 426 and/or the pump system 150, 450. In one or more embodiments, the downhole sensor 118, 418 and/or the surface sensor 121, 421 may be configured to monitor the amperage being drawn by the motor 116, 416 of the pump system 150, 450. In one or more embodiments, if the amperage being drawn by the motor 116, 416 drops by a predetermined amount or below a predetermined threshold amount, the controller 120, 420 at the surface 102, 402 may be configured to send control signals to effect the actuation of the gas relief valve 112, 412 so as to seal off the fluid in the production tubing section 122, 422 and allow the pump system 150, 450 to pump any gas particles trapped in the pump 108, 408 out of the gas relief valve 112, 412 and into an annulus of the wellbore. However, in other embodiments, the downhole sensor 118, 418 and/or the surface sensor 121, 421 may be configured to monitor any characteristic of the fluid 126, 426 or the pump system 150, 450 that may be used to determine if gas has been trapped in the pump 108, 408 and caused a degradation in the performance of the pump 108, 408. By way of example only, other parameters that may be monitored to determine if gas has been or will be trapped in the pump 108, 408 include the flowrate of the fluid being pumped to the surface, the ratio of gas to other fluids in the fluid being extracted from the downhole formation, or the pressure detected in the fluid below the pump of the pump system. One of ordinary skill in the art would understand that in other embodiments, the gas relief valve 412 may be hydraulically connected to the pump 408 such that a control signal is not needed to actuate the actuator, but instead, the actuator passively actuates based on the pressure difference experienced across the pump 408. Further, one or ordinary skill in the art would understand that while activation of the gas relief valve 108, 408 may be carried out automatically based on programming of the sensors 118, 121, 418, 421 and the controller 120, 420 the gas relief valve may also be activated as a result of user input into the system at any time.

In one or more embodiments, the control signal to actuate the actuator 164 of the gas relief valve 112 is sent by the controller 120 to the gas relief valve 112 either directly or indirectly by way of an electrical cable 110. However, in other embodiments, the control signal to actuate the actuator 464 of the gas relief valve 412 is sent by the controller 420 to the hydraulic pump 495 either directly or indirectly.

At step 606, when the gas blockage of the pump system 150, 450 is detected, the controller 120, 420 sends a control signal to actuate the gas relief valve 112, 412, and at step 607, the gas relief valve 112, 412 actuates from a first position in which the flow path through the housing 160, 460 is through the production flow path 162, 462 to a second position in which the flow path through the housing 160 is through the gas release flow path 163, 463, and the production flow path 162, 462 and the column of pressure from the fluid 126, 426 within the production tubing sections 122, 422 is sealed off from the rest of the pump system 150, 450. In one or more embodiments, the rotary disk system 166, 466 of the gas relief valve 112, 412 may be caused to rotate from the first position to the second position by way of the actuator 164, 464, which is operated by way of either a power received from electrical cables 110 or a hydraulic power received from hydraulic lines 490.

At step 608, once the rotary disk 168, 468 of the rotary disk system 166, 466 is rotated to the second position and the gas release flow path 163, 463 is opened, gas is released through the vent port 170, 470 into the annulus of the wellbore. Removing the gas from the pump system 150, 450 helps to prevent or minimize the potential for a gas-lock occurring in the pump system 150, 450. The gas relief valve 112, 412 may remain in this venting position for a predetermined amount of time or until the one or more monitored parameters return to normal (i.e., by returning to above the predetermined threshold or by stabilizing for a predetermined amount of time). Further, one or ordinary skill in the art would understand that in one or more embodiments, the gas relief valve may be maintained in this venting position for however long a user wishes to maintain it in this venting position as a result of user input into the system.

At step 610, the gas relief valve 112, 412 may be actuated such that the rotary disk 168, 468 of the rotary disk system 166, 466 is rotated back from the second position to the first position in which the flow path through the housing 160 is through the production flow path 162, 462. In one or more embodiments, the gas relief valve 112, 412 may be actuated from the second position to the first position due to a control signal received from the controller 120, 420. The controller may be configured to send the control signal once the predetermined amount of time has been reached, the monitored parameters have returned to normal, or the user has manually input the control signal into the system. Further, in one or more embodiments, the pump is kept running from the commencement of pumping operations at step 604 through the return of the rotary disk 168, 468 to the first position such that once the rotary disk 168, 468 reaches the first position, the system will have returned to its previous state of normal pumping operations.

According to one or more aspects of the present disclosure, the pump system provides an efficient and cost-effective system for releasing gas that has or may become trapped within the pump of a pump system. The pump system according to one or more aspects of the present disclosure reduces or eliminates a gas-lock condition within a pump, which improves pump performance By reducing or eliminating the gas-lock condition during pumping operations using the pump system according to one or more aspects of the present disclosure, performance of the pump is improved with minimal interruption or decrease in productivity.

An embodiment of the present disclosure is a pump system including: a pump; a gas relief valve, a motor; and a sensor. The gas relief valve includes: an actuator; and a rotary disk system. The rotary disk system includes: a stationary disk and a rotary disk. The actuator is rotationally coupled to the rotary disk. In a first position, the gas relief valve directs a flow of a fluid within the gas relief valve into a production tubing, and in a second position, the gas relief valve directs the flow of the fluid within the gas relief valve into an annulus of a wellbore. The motor is configured to turn the pump. The sensor is configured to measure a parameter of at least one of the fluid or the pump system. The gas relief valve is coupled to the pump.

In one or more embodiments described in the preceding paragraph, the gas relief valve further comprises: a housing, wherein the housing comprises a vent port disposed on a side wall; and an actuator isolation wall, wherein the actuator isolation wall is disposed within the housing such that a production flow path is formed within the housing and the actuator is isolated from the production flow path. In one or more embodiments described in the preceding paragraph, in the first position, the stationary disk and the rotary disk of the rotary disk system direct fluid flow within the gas relief valve through the production flow path and into the production tubing, and in the second position, the stationary disk and the rotary disk of the rotary disk system form a gas release flow path and direct fluid flow within the gas relief valve through the gas release flow path, through the vent port, and into the annulus of the wellbore. In one or more embodiments described in the preceding paragraph, the stationary disk includes a production flow path opening and a gas release flow path opening, the rotary disk includes a flow path opening, and the stationary disk is disposed within the housing such that the gas release flow path opening is aligned with the vent port and the production flow path opening is aligned with the production flow path. In one or more embodiments described in the preceding paragraph, in the first position, the flow path opening of the rotary disk is aligned with the production flow path opening of the stationary disk, and in the second position, the flow path opening of the rotary disk is aligned with the gas release flow path opening of the stationary disk. In one or more embodiments described in the preceding paragraph, the gas relief valve is positioned uphole from the pump and downhole from the production tubing, and the gas relief valve is coupled to the production tubing. In one or more embodiments described in the preceding paragraph, the pump system further comprises a controller and an electrical cable, and the gas relief valve further comprises: a power connector; and an internal electrical cable, wherein the controller is electrically and communicatively coupled to the sensor and the gas relief valve by way of the electrical cable, wherein the electrical cable is coupled to the power connector, wherein the power connector is electrically and communicatively coupled to the actuator by way of the internal electrical cable, and wherein the controller is configured to send one or more control signals to the gas relief valve to actuate the actuator to rotate the rotary disk between the first position and the second position. In one or more embodiments described in the preceding paragraph, the parameter of at least one of the fluid or the pump system is an amperage being drawn by the motor, and when the amperage being drawn by the motor drops below a predetermined threshold, the controller is configured to send the one or more control signals to actuate the actuator to rotate the rotary disk from the first position to the second position. In one or more embodiments described in the preceding paragraph, the rotary disk system further comprises a drive shaft, the drive shaft is disposed through the stationary disk, the draft shaft is rotationally coupled to the rotary disk, and the actuator is rotationally coupled to the drive shaft.

Another embodiment of the present disclosure is a gas relief valve including an actuator and a rotary disk system. The rotary disk system includes a stationary disk and a rotary disk. The actuator is rotationally coupled to the rotary disk. In a first position, the gas relief valve directs a flow of a fluid within the gas relief valve into a production tubing, and in a second position, the gas relief valve directs the flow of the fluid within the gas relief valve into an annulus of a wellbore.

In one or more embodiments described in the preceding paragraph, the gas relief valve further comprises: a housing, wherein the housing comprises a vent port disposed on a side wall; and an actuator isolation wall, wherein the actuator isolation wall is disposed within the housing such that a production flow path is formed within the housing and the actuator is isolated from the production flow path. In one or more embodiments described in the preceding paragraph, in the first position, the stationary disk and the rotary disk of the rotary disk system direct fluid flow within the gas relief valve through the production flow path and into the production tubing, and in the second position, the stationary disk and the rotary disk of the rotary disk system form a gas release flow path and direct fluid flow within the gas relief valve through the gas release flow path, through the vent port, and into the annulus of the wellbore. In one or more embodiments described in the preceding paragraph, the stationary disk includes a production flow path opening and a gas release flow path opening, the rotary disk includes a flow path opening, the stationary disk is disposed within the housing such that the gas release flow path opening is aligned with the vent port and the production flow path opening is aligned with the production flow path, and in the first position, the flow path opening of the rotary disk is aligned with the production flow path opening of the stationary disk, and in the second position, the flow path opening of the rotary disk is aligned with the gas release flow path opening of the stationary disk. In one or more embodiments described in the preceding paragraph, the gas relief valve further comprises: a power connector; and an internal electrical cable, wherein the power connector is electrically and communicatively coupled to the actuator by way of the internal electrical cable.

Another embodiment of the present disclosure is a method including: positioning a pump system having a gas relief valve in a wellbore; activating a pump of the pump system; actuating the rotary disk system from the first position to the second position; releasing gas through a vent port on the gas relief valve; and actuating the rotary disk system from the second position to the first position. The gas relief valve includes an actuator and a rotary disk system. The rotary disk system includes a stationary disk and a rotary disk. The actuator is configured to rotate the rotary disk between a first position and a second position, where, in the first position, a flow of a fluid within the gas relief valve is directed into a production tubing, and in the second position, the flow of the fluid within the gas relief valve is directed into an annulus of a wellbore.

In one or more embodiments described in the preceding paragraph, the method further includes: measuring a parameter of at least one of the fluid or the pump system; and sending a control signal to the gas relief valve to actuate the rotary disk system from the first position to the second position when the measured parameter drops below a predetermined threshold. In one or more embodiments described in the preceding paragraph, the pump system further includes a sensor, the sensor is configured to measure the parameter, and a controller is configured to send the control signal to the gas relief valve to actuate the rotary disk system from the first position to the second position. In one or more embodiments described in the preceding paragraph, releasing gas through the vent port on the gas relief valve results in a reduction or elimination of a gas-lock condition within the pump system. In one or more embodiments described in the preceding paragraph, the method further includes: coupling a pump of the pump system to a downhole side of the gas relief valve; coupling a motor of the pump system to the pump, wherein the motor is configured to turn the pump; coupling a sensor of the pump system to a downhole side of the motor; and electrically and communicatively coupling an electrical cable of the pump system to one or more of the motor, the sensor, and the gas relief valve.

The present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A wellbore pump system, comprising:
   a pump;
   a motor configured to turn the pump;
   a gas relief valve coupled to the pump, wherein the gas relief valve comprises:
      a housing defining a production flow path and defining an exhaust port in a side wall of the housing;
      an actuator disposed within the housing, and
      a rotary disk system disposed within the housing comprising
         a stationary disk defining a first aperture that aligns with the production flow path of the housing and defining a second aperture that aligns with the exhaust port of the housing, and
         a rotary disk defining a flow aperture,
      wherein the actuator is rotationally coupled to the rotary disk,
      wherein, in a first position of the rotary disk, the rotary disk is configured to direct a flow of a fluid received by the gas relief value from the pump through the flow aperture of the rotary disk, through the first aperture of the stationary disk, and into the production flow path of the housing and the rotary disk is configured to block a flow of the fluid through the second aperture of the stationary disk and out the exhaust port of the housing, and
      wherein, in a second position of the rotary disk, the rotary disk is configured to direct the flow of the fluid through the flow aperture of the rotary disk, through the second aperture of the stationary disk, and out the exhaust port of the housing and the rotary disc is configured to block the flow of the fluid through the first aperture of the stationary disk and into the production flow path of the housing.

2. The wellbore pump system of claim 1, wherein the gas relief valve further comprises:
   an actuator isolation wall, wherein the actuator isolation wall is disposed within the housing such that the production flow path is formed within the housing and the actuator is isolated from the production flow path.

3. The wellbore pump system of claim 1, wherein:
   the pump is disposed downhole in a wellbore and the gas relief valve is positioned uphole from the pump and downhole from a production tubing; and
   the gas relief valve is coupled to the production tubing.

4. The wellbore pump system of claim 1, further comprising:
   a sensor;
   a controller; and
   an electrical cable,
   wherein the gas relief valve further comprises:
      a power connector; and
      an internal electrical cable,
   wherein the controller is electrically and communicatively coupled to the sensor and the gas relief valve by way of the electrical cable,
   wherein the electrical cable is coupled to the power connector,
   wherein the power connector is electrically and communicatively coupled to the actuator by way of the internal electrical cable, and
   wherein the controller is configured to send one or more control signals to the gas relief valve to actuate the actuator to rotate the rotary disk between the first position and the second position.

5. The wellbore pump system of claim 4, wherein:
   the parameter of at least one of the fluid or the pump system is an amperage being drawn by the motor; and
   when the amperage being drawn by the motor drops below a predetermined threshold, the controller is configured to send the one or more control signals to actuate the actuator to rotate the rotary disk from the first position to the second position.

6. The wellbore pump system of claim 1, wherein:
   the rotary disk system further comprises a drive shaft;
   the drive shaft is disposed through the stationary disk;
   the draft shaft is rotationally coupled to the rotary disk; and
   the actuator is rotationally coupled to the drive shaft.

7. The wellbore pump system of claim 1, wherein a downhole opening of the second aperture of the stationary disk is circular in cross-section and wherein the second aperture of the stationary disk defines a curved path from the downhole opening of the second aperture of the rotary disk to an opening at the outside circumference of the stationary disk.

8. The wellbore pump system of claim 1, wherein the flow aperture of the rotary disk is bean-shaped in cross-section, wherein an area of the flow aperture of the rotary disk is greater than the area of the downhole opening of the second aperture of the stationary disk, and wherein the first aperture of the stationary disk is bean-shaped in cross-section and is substantially equal in cross-section area to the cross-section area of the flow aperture of the rotary disk.

9. A gas relief valve, comprising:
   a housing defining a production flow path and defining an exhaust port in a side wall of the housing;
   an actuator disposed within the housing; and
   a rotary disk system disposed within the housing comprising
      a stationary disk defining a first aperture that aligns with the production flow path of the housing and defining a second aperture that aligns with the exhaust port of the housing and
      a rotary disk defining a flow aperture,
   wherein the actuator is rotationally coupled to the rotary disk,
   wherein, in a first position of the rotary disk, the rotary disk is configured to direct a flow of a fluid within the gas relief valve through the flow aperture of the rotary disk, through the first aperture of the stationary disk, and into the production flow path of the housing and the rotary disk is configured to block a flow of the fluid through the second aperture of the stationary disk, and wherein, in a second position of the rotary disk, the rotary disk is configured to direct the flow of the fluid through the flow aperture of the rotary disk, through the second aperture of the stationary disk, and out the exhaust port in the side wall of the housing and the rotary disk is configured to block the flow of the fluid through the first aperture of the stationary disk and into the production flow path of the housing.

10. The gas relief valve of claim 9, wherein the gas relief valve further comprises:
an actuator isolation wall, wherein the actuator isolation wall is disposed within the housing such that the production flow path is formed within the housing and the actuator is isolated from the production flow path.

11. The gas relief valve of claim 9, wherein the gas relief valve further comprises:
a power connector; and
an internal electrical cable,
wherein the power connector is electrically and communicatively coupled to the actuator by way of the internal electrical cable.

12. The gas relief valve of claim 9, wherein:
the rotary disk system further comprises a drive shaft;
the drive shaft is disposed through the stationary disk;
the draft shaft is rotationally coupled to the rotary disk; and
the actuator is rotationally coupled to the drive shaft.

13. The gas relief valve of claim 9, wherein a downhole opening of the second aperture of the stationary disk is circular in cross-section and wherein the second aperture of the stationary disk defines a curved path from the downhole opening of the second aperture of the rotary disk to an opening at the outside circumference of the stationary disk.

14. The gas relief valve of claim 13, wherein the flow aperture of the rotary disk is bean-shaped in cross-section and wherein an area of the flow aperture of the rotary disk is greater than the area of the downhole opening of the second aperture of the stationary disk.

15. The gas relief valve of claim 14, wherein the first aperture of the stationary disk is bean-shaped in cross-section and is substantially equal in cross-section area to the cross-section area of the flow aperture of the rotary disk.

16. A method, comprising:
positioning a pump system having a gas relief valve in a wellbore, wherein the gas relief valve comprises:
a housing defining a production flow path and defining an exhaust port in a side wall of the housing;
an actuator disposed within the housing; and
a rotary disk system disposed within the housing comprising
a stationary disk defining a first aperture that aligns with the production flow path of the housing and defining a second aperture that aligns with the exhaust port of the housing and a rotary disk defining a flow aperture,
wherein the actuator is configured to rotate the rotary disk between a first position and a second position,
wherein, in the first position of the rotary disk, the rotary disk is configured to direct a flow of a fluid through the flow aperture of the rotary disk, through the first aperture of the stationary disk, into the production flow path of the housing, and into a production tubing and the rotary disk is configured to block a flow of the fluid through the second aperture of the stationary disk, and
wherein, in a second position of the rotary disk, the rotary disk is configured to direct the flow of the fluid through the flow aperture of the rotary disk, through the second aperture of the stationary disk, and out the exhaust port in the side wall of the housing and the rotary disk is configured to block the flow of the fluid through the first aperture of the stationary disk and into the production flow path of the housing;
activating a pump of the pump system;
actuating the rotary disk system from the first position to the second position;
releasing gas through the exhaust port in the side wall of the housing of the gas relief valve; and
actuating the rotary disk system from the second position to the first position.

17. The method of claim 16, further comprising:
measuring a parameter of at least one of the fluid or the pump system; and
sending a control signal to the gas relief valve to actuate the rotary disk system from the first position to the second position when the measured parameter drops below a predetermined threshold.

18. The method of claim 17, wherein:
the pump system further comprises a sensor;
the sensor is configured to measure the parameter; and
a controller is configured to send the control signal to the gas relief valve to actuate the rotary disk system from the first position to the second position.

19. The method of claim 16, wherein releasing gas through the exhaust port in the side wall of the housing of the gas relief valve results in a reduction or elimination of a gas-lock condition within the pump system.

20. The method of claim 16, further comprising:
coupling a pump of the pump system to a downhole side of the gas relief valve;
coupling a motor of the pump system to the pump, wherein the motor is configured to turn the pump;
coupling a sensor of the pump system to a downhole side of the motor; and
electrically and communicatively coupling an electrical cable of the pump system to one or more of the motor, the sensor, and the gas relief valve.

* * * * *